United States Patent
Haberman et al.

(10) Patent No.: US 8,006,261 B1
(45) Date of Patent: Aug. 23, 2011

(54) SYSTEM AND METHOD FOR PERSONALIZED MESSAGE CREATION AND DELIVERY

(75) Inventors: Seth Haberman, New York, NY (US); Chet Schuler, Marlboro, MA (US)

(73) Assignee: Visible World, Inc., New York, NY (US)

( * ) Notice: Subject to any disclaimer, the term of this patent is extended or adjusted under 35 U.S.C. 154(b) by 0 days.

(21) Appl. No.: 09/545,015

(22) Filed: Apr. 7, 2000

(51) Int. Cl.
*H04N 7/10* (2006.01)

(52) U.S. Cl. ............................. 725/34; 725/32; 725/35

(58) Field of Classification Search .................... 725/32, 725/34, 35
See application file for complete search history.

(56) References Cited

U.S. PATENT DOCUMENTS

| | | | |
|---|---|---|---|
| 3,366,731 A | 1/1968 | Wallerstein | 358/86 |
| 3,639,686 A | 2/1972 | Walker et al. | 455/4.1 |
| 4,331,974 A | 5/1982 | Cogswell et al. | 358/86 |
| 4,475,123 A | 10/1984 | Dumbauld et al. | 358/86 |
| 4,573,072 A | 2/1986 | Freeman | 358/86 |
| 4,602,279 A | 7/1986 | Freeman | 358/86 |
| 4,625,235 A | 11/1986 | Watson | 358/86 |
| 4,638,359 A | 1/1987 | Watson | 358/142 |
| 4,703,423 A | 10/1987 | Bado et al. | 395/201 |
| 4,716,410 A | 12/1987 | Nozaki | 358/86 |
| 4,789,235 A | 12/1988 | Borah et al. | 351/246 |
| 4,814,883 A * | 3/1989 | Perine et al. | 725/36 |
| 4,847,698 A | 7/1989 | Freeman | 358/343 |
| 4,847,699 A | 7/1989 | Freeman | 358/343 |
| 4,847,700 A | 7/1989 | Freeman | 358/343 |
| 4,850,007 A | 7/1989 | Marino et al. | 379/67 |
| 4,918,516 A | 4/1990 | Freeman | 358/86 |
| 5,099,422 A * | 3/1992 | Foresman et al. | 705/1 |
| 5,105,184 A | 4/1992 | Pirani et al. | 345/115 |
| 5,155,591 A | 10/1992 | Wachob | 455/4.2 |
| 5,173,900 A | 12/1992 | Miller et al. | 370/110.1 |
| 5,220,501 A | 6/1993 | Lawlor et al. | 380/24 |
| 5,231,494 A | 7/1993 | Wachob | 358/146 |
| RE34,340 E | 8/1993 | Freeman | 358/86 |
| 5,253,940 A | 10/1993 | Abecassis | 400/495 |
| 5,260,778 A | 11/1993 | Kauffman et al. | 358/86 |
| 5,291,395 A | 3/1994 | Abecassis | 364/401 |
| 5,305,195 A | 4/1994 | Murphy | 705/1 |
| 5,343,239 A | 8/1994 | Lappington et al. | 348/12 |

(Continued)

FOREIGN PATENT DOCUMENTS

WO    WO 9926415 A1 *    5/1999

*Primary Examiner* — Pankaj Kumar
*Assistant Examiner* — Sahar A Baig
(74) *Attorney, Agent, or Firm* — K&L Gates LLP

(57) ABSTRACT

A system and method for dynamically creating individualized, multi-media messages and to deliver the messages to specific target groups or individual viewers. A message, story, or advertisement is assembled on demand, based upon rules applied to each viewer's profile and a library of media segments. The framework for the final personalized message is a story or message template designed for a campaign. A set of viewer profiles is assembled from designated databases for each of the targeted entities. A collection of media segments is also created or selected and then made available to produce the final personalized message at assembly time. Specific media segments are selected and merged according to the message template and information about the viewer derived from each viewer's profile. The information from the viewer profile is interpreted by a rule system to determine which of several potential media segments to select for use in the personalized message. The merged composite is then encoded to match the distribution media and forwarded to the viewer.

10 Claims, 10 Drawing Sheets

U.S. PATENT DOCUMENTS

| | | | |
|---|---|---|---|
| 5,347,632 A | 9/1994 | Filepp et al. | 395/200.32 |
| 5,356,151 A | 10/1994 | Abecassis | 273/243 |
| 5,361,393 A | 11/1994 | Rossillo | 395/651 |
| 5,377,354 A | 12/1994 | Scnnell et al. | 395/673 |
| 5,412,416 A * | 5/1995 | Nemirofsky | 725/36 |
| 5,414,455 A | 5/1995 | Hooper et al. | 348/7 |
| 5,422,468 A | 6/1995 | Abecassis | 235/380 |
| 5,424,770 A | 6/1995 | Schmelzer et al. | 348/9 |
| 5,426,281 A | 6/1995 | Abecassis | 235/379 |
| 5,434,678 A | 7/1995 | Abecassis | 358/342 |
| 5,442,390 A | 8/1995 | Hooper et al. | 348/7 |
| 5,442,771 A | 8/1995 | Filepp et al. | 395/200.49 |
| 5,446,919 A * | 8/1995 | Wilkins | 725/35 |
| 5,448,568 A | 9/1995 | Delpuch et al. | 372/94.2 |
| 5,499,046 A | 3/1996 | Schiller et al. | 348/6 |
| 5,515,098 A | 5/1996 | Carles | 348/8 |
| 5,515,270 A | 5/1996 | Weinblatt | 395/214 |
| 5,519,433 A | 5/1996 | Lappington et al. | 348/2 |
| 5,526,035 A | 6/1996 | Lappington et al. | 348/13 |
| 5,537,141 A | 7/1996 | Harper et al. | 348/12 |
| 5,548,532 A | 8/1996 | Menand et al. | 364/514 |
| 5,550,735 A * | 8/1996 | Slade et al. | 700/99 |
| 5,566,353 A | 10/1996 | Cho et al. | 455/2 |
| 5,584,025 A | 12/1996 | Keithley et al. | 707/104 |
| 5,585,838 A * | 12/1996 | Lawler et al. | 725/54 |
| 5,585,858 A | 12/1996 | Harper et al. | 348/485 |
| 5,594,910 A | 1/1997 | Filepp et al. | 395/800.28 |
| 5,610,653 A | 3/1997 | Abecassis | 348/110 |
| 5,617,142 A | 4/1997 | Hamilton | 348/405 |
| 5,632,007 A | 5/1997 | Freeman | 395/75 |
| 5,634,849 A | 6/1997 | Abecassis | 463/30 |
| 5,636,346 A | 6/1997 | Saxe | 395/201 |
| 5,638,113 A | 6/1997 | Lappington et al. | 348/12 |
| 5,652,615 A | 7/1997 | Bryant et al. | |
| 5,671,225 A | 9/1997 | Hooper et al. | 370/468 |
| 5,682,196 A | 10/1997 | Freeman | 348/13 |
| 5,684,918 A | 11/1997 | Abecassis | 386/83 |
| 5,696,869 A | 12/1997 | Abecassis | 386/52 |
| 5,717,814 A | 2/1998 | Abecassis | 386/46 |
| 5,717,923 A | 2/1998 | Dedrick | 707/102 |
| 5,724,091 A | 3/1998 | Freeman et al. | 348/13 |
| 5,724,472 A | 3/1998 | Abecassis | 386/52 |
| 5,724,521 A | 3/1998 | Dedrick | 705/26 |
| 5,734,413 A | 3/1998 | Lappington et al. | 348/12 |
| 5,740,388 A | 4/1998 | Hunt | 395/388 |
| 5,740,549 A | 4/1998 | Reilly et al. | 705/14 |
| 5,754,939 A | 5/1998 | Herz et al. | 455/4.2 |
| 5,758,259 A * | 5/1998 | Lawler | 725/45 |
| 5,761,601 A | 6/1998 | Nemirofsky et al. | 455/3.1 |
| 5,764,275 A | 6/1998 | Lappington et al. | 348/12 |
| 5,768,521 A | 6/1998 | Dedrick | 395/200.54 |
| 5,774,170 A * | 6/1998 | Hite et al. | 725/34 |
| 5,774,664 A | 6/1998 | Hidary et al. | 395/200.48 |
| 5,778,181 A | 7/1998 | Hidary et al. | 395/200.48 |
| 5,784,095 A | 7/1998 | Robbins et al. | 348/6 |
| 5,784,528 A | 7/1998 | Yamane et al. | 386/112 |
| 5,796,945 A | 8/1998 | Tarabella | 395/200.49 |
| 5,802,314 A | 9/1998 | Tullis et al. | 395/200.76 |
| 5,805,974 A * | 9/1998 | Hite et al. | 725/69 |
| 5,825,884 A | 10/1998 | Zdepski et al. | 380/25 |
| 5,835,087 A | 11/1998 | Herz et al. | 345/327 |
| 5,861,881 A | 1/1999 | Freeman et al. | 345/302 |
| 5,867,208 A | 2/1999 | McLaren | 348/13 |
| 5,873,068 A | 2/1999 | Beaumont et al. | |
| 5,884,305 A * | 3/1999 | Kleinberg et al. | 707/6 |
| 5,887,243 A | 3/1999 | Harvey et al. | 455/3.1 |
| 5,903,263 A | 5/1999 | Emura et al. | |
| 5,907,837 A | 5/1999 | Ferrel et al. | 707/3 |
| 5,913,031 A | 6/1999 | Blanchard | 395/200.34 |
| 5,917,830 A | 6/1999 | Chen et al. | 370/487 |
| 5,929,850 A | 7/1999 | Broadwin et al. | 345/327 |
| 5,931,901 A * | 8/1999 | Wolfe et al. | 709/206 |
| 5,937,331 A | 8/1999 | Kalluri et al. | 455/6.1 |
| 5,978,799 A | 11/1999 | Hirsch | 707/4 |
| 5,986,692 A * | 11/1999 | Logan et al. | 725/35 |
| 5,991,735 A | 11/1999 | Gerace | 705/10 |
| 6,002,393 A | 12/1999 | Hite et al. | 345/327 |
| 6,018,768 A | 1/2000 | Ullman et al. | 709/218 |
| 6,026,368 A | 2/2000 | Brown et al. | 705/14 |
| 6,029,045 A * | 2/2000 | Picco et al. | 725/34 |
| 6,038,000 A | 3/2000 | Hurst, Jr. et al. | 348/845 |
| 6,038,367 A | 3/2000 | Abecassis | 386/46 |
| 6,049,569 A | 4/2000 | Radha et al. | 375/240 |
| 6,067,348 A | 5/2000 | Hibbeler | 379/88.16 |
| 6,075,551 A | 6/2000 | Berezowski et al. | 348/9 |
| 6,108,486 A | 8/2000 | Sawabe et al. | 386/98 |
| 6,137,834 A | 10/2000 | Wine et al. | 375/240 |
| 6,141,358 A | 10/2000 | Hurst, Jr. et al. | 370/543 |
| 6,160,570 A * | 12/2000 | Sitnik | 725/9 |
| 6,304,852 B1 * | 10/2001 | Loncteaux | 705/14 |
| 6,327,574 B1 | 12/2001 | Kramer et al. | 705/14 |
| 6,330,286 B1 | 12/2001 | Lyons et al. | |
| 6,343,287 B1 | 1/2002 | Kumar et al. | 707/4 |
| 6,357,042 B2 | 3/2002 | Srinivasan et al. | |
| 6,360,234 B2 | 3/2002 | Jain et al. | |
| 6,408,278 B1 | 6/2002 | Carney et al. | |
| 6,411,992 B1 * | 6/2002 | Srinivasan et al. | 709/218 |
| 6,424,991 B1 | 7/2002 | Gish | 709/203 |
| 6,449,657 B2 | 9/2002 | Stanbach, Jr. et al. | 709/245 |
| 6,457,010 B1 * | 9/2002 | Eldering et al. | 707/10 |
| 6,463,444 B1 | 10/2002 | Jain et al. | |
| 6,463,585 B1 * | 10/2002 | Hendricks et al. | 725/35 |
| 6,466,975 B1 | 10/2002 | Sterling | 709/223 |
| 6,502,076 B1 | 12/2002 | Smith | |
| 6,567,980 B1 | 5/2003 | Jain et al. | |
| 6,574,793 B1 | 6/2003 | Ngo et al. | |
| 6,588,013 B1 * | 7/2003 | Lumley et al. | 725/32 |
| 6,601,237 B1 * | 7/2003 | Ten Kate et al. | 725/47 |
| 6,611,624 B1 | 8/2003 | Zhang et al. | |
| 6,671,880 B2 | 12/2003 | Shah-Nazaroff et al. | |
| 6,678,332 B1 | 1/2004 | Gardere et al. | |
| 6,681,395 B1 * | 1/2004 | Nishi | 725/45 |
| 6,694,482 B1 * | 2/2004 | Arellano et al. | 715/500.1 |
| 6,698,020 B1 | 2/2004 | Zigmond et al. | |
| 6,735,628 B2 | 5/2004 | Eyal | |
| 6,785,289 B1 | 8/2004 | Ward et al. | |
| 6,806,909 B1 | 10/2004 | Radha et al. | |
| 6,850,252 B1 | 2/2005 | Hoffberg | |
| 6,857,024 B1 | 2/2005 | Chen et al. | |
| 6,877,134 B1 | 4/2005 | Fuller et al. | |
| 2001/0013124 A1 | 8/2001 | Klosterman et al. | |
| 2002/0026359 A1 * | 2/2002 | Long et al. | 705/14 |
| 2002/0056093 A1 | 5/2002 | Kunkel et al. | |
| 2002/0057336 A1 | 5/2002 | Gaul et al. | |
| 2002/0083443 A1 | 6/2002 | Eldering et al. | |
| 2002/0092017 A1 * | 7/2002 | Klosterman et al. | 725/35 |
| 2002/0095676 A1 * | 7/2002 | Knee et al. | 725/46 |
| 2003/0110500 A1 | 6/2003 | Rodriguez | |
| 2003/0177503 A1 | 9/2003 | Sull et al. | |
| 2004/0025180 A1 | 2/2004 | Begeja et al. | |
| 2004/0111742 A1 | 6/2004 | Hendricks et al. | |
| 2004/0136698 A1 | 7/2004 | Mock | |
| 2005/0086691 A1 | 4/2005 | Dudkiewicz et al. | |
| 2005/0086692 A1 | 4/2005 | Dudkiewicz et al. | |
| 2005/0166224 A1 * | 7/2005 | Ficco | 725/35 |

* cited by examiner

SYSTEM AND METHOD FOR PERSONALIZED MESSAGE CREATION AND DELIVERY

FIELD OF THE INVENTION

This invention is directed towards video and media creation, and more particularly towards a system for creating individualized messages based on user information.

BACKGROUND OF THE INVENTION

Marketers have come to rely on demographic solutions to establish patterns and trends about the purchasing habits of their customers and how these habits relate to media purchases, demographics, and other factors. Alongside companys' proprietary databases, third party data warehouses have evolved, fashioned by many companies who share information either about specific customers or about data extracted from their customer bases. In both cases, advertisers use the derived information to generate observations relating to their markets, target individuals to different types of offerings and select appropriate media purchases for advertising. In the case of video advertising media, e.g., video tapes that are mailed, internet video streams, or broadcast or cable advertising—there are only limited means to produce personalized versions of the advertisements or direct marketing information that directly takes advantage of the information available about consumers purchasing habits and the like. Mostly, this reflects the nature of the traditional delivery media for video, which, until very recently, provided very limited capability to deliver anything more than a common message. As such, even though companies know a tremendous amount of information about their customers, the ability to leverage this information has been limited by the fundamentals of the broadcast medium, requiring a like message to be sent to all customers. Additionally, the nature of video production, focused typically on one product, does not allow for incremental content changes. This forces advertisers to avoid topically relevant information and offerings.

An early attempt to merge the power of real-time television with the information content of the Internet is disclosed in U.S. Pat. No. 5,778,181, Hidary, et. al., dated Jul. 7, 1998 (the '181 patent), in which a user is presented with a video along with related Internet information. A user has a personal computer connected to two signal paths: a video signal and a second separate connection to the Internet for receiving Internet information. To use the described system, the video producer needs to first create the video, encode the Internet addresses (or URLs) of web pages, and then distribute the composite information. A limited portion of the vertical blanking interval (VBI) of the video signal is encoded to deliver the URLs. The client software retrieves and decodes URLs from the video program. These URLs are interpreted, and direct the web browser software to retrieve web pages. The web pages are synchronized to the video content for display. Alternatively, the encoded video signal could be simultaneously routed to a specialized server that decodes the URLs, contacts the addressed Internet server, and directs the server to send the designated web pages via the Internet to the user's PC where they are then displayed. Among the disadvantages of the system such as described, is that the video and corresponding web content are static and defined by the video producer during production. The same URLs are sent to every viewer of the same video. There is no change to the content of the video according to any real-time understanding of the viewer. Similarly, no mechanism is described for changing the content of the web pages in real time either, even if the server somehow obtained information about the preferences of the viewer.

A somewhat selective system is described in Abecassis, U.S. Pat. No. 5,717,814, issued Feb. 10, 1998. The system in the '814 patent includes a capability for a more individualized control over the contents of a requested video program. Segments, or clips, of a video scene are first evaluated and rated according to criteria such as the amount of violence, nudity, or profanity, as well as other criteria related to other elements of the clip (location, time, detail, etc.). Each clip is associated with a record containing keywords related to the subject matter, such as "flag burning," that a user may prefer not to see. A series of clips (a "program") is then mapped into a series that constitutes the presentation when viewed in sequence. During run-time, the actual series of clips shown are selected from the library of clips according to the user's preferences. Thus, a viewer might decide to watch a condensed version of a movie without any gore while another viewer may prefer a lengthier version with gore but not profanity. A producer and director can also create multiple versions of important scenes that will be viewed according to the viewer's preferences. As the price of such user-selection, this system not only requires the producers initially to rate, key, and map each segment in a movie according to the various parameters, but also requires a specialized viewing system that can translate the viewer's preferences into the proper selection and mapping criteria for properly sequencing the optional segments during the playback. For example, a specialized laser-disk unit would be programmed to play a specially encoded disk according to the viewer's desires. In a wideband network context, the transmission system would first upload user preferences, omit non-conforming clips, and create the resulting download movie. In any case, the result is a pre-selected set of clips, as a function of the user preferences, that will be played in sequence for the viewer. The creation and inclusion of clips in the program must necessarily precede consideration of the user's preferences. The viewer is not really interacting with the producers, but only the machine making the selection of pre-selected clips. No "new" materials are selected or incorporated into the show during viewing—only "old" materials that have been pulled together as a function of the user's selected preference. Thus, nothing is "created" specifically for the viewer.

A somewhat more interactive solution is described in Freeman, U.S. Pat. No. 5,861,881, issued Jan. 19, 1999, in which a user interacts with a computer to determine which of several cable TV or other audio-visual inputs will be displayed on the screen at any given time. Stored user commands determine which of the multiplexed signals will be selected, and specialized hardware "seamlessly" switches between video channels, such that the user cannot perceive the switchover (other than the change of content). For example, at the start of a sports program, the user can select the preferred language of the audio segments, and whether on-screen graphics (e.g., player statistics) should be displayed. These inputs can be used to insert scheduled "trigger points" into the video or digital program which are later used to select the audio-visual combinations preferred according to inputs by the user. When a trigger point is played, the computer system selects a different video segment, graphic, or audio segment, either from alternate channels, or from a database of such segments downloaded to the computer on a second communication channel (either in parallel with the primary transmission, or on CD-ROM, or at some other time). As with other versions of this approach, the user must intentionally interact with the program to select the preferences. Also, the only selectable segments are those produced as part of the program. There is no real-time search for or compilation of new materials. The user preferences are only evaluated according to the pre-selected criteria that correspond to segment selections. Each video segment is either played or not played; but the video segment itself is not modified according to any user inputs.

The television industry's reaction to the limitations of broadcast medium has been "localism," that is, an attempt to target audiences by demographic, geographic and psychographic means. Localism reflects market generalizations, often derived from actual profiles and data. Localism is offered in the broadcast forum by buying placements in geographic areas. On cable this can be a neighborhood. On specific television shows it can be via reflecting certain viewer preferences according to demographics, or times of day. The results have left advertisers, who pay by the "eyeball," dissatisfied with the expediency of their advertising dollars. The cable television industry, in an attempt to respond to these shortcomings and to distinguish its offering from broadcast, is deploying addressable advertising systems which allow advertisers to purchase individual households or even single set-top boxes for their ads, allowing, when combined with household profiles, an extremely fine grain of targeting to reach the appropriate viewers.

This form of targeted or addressable advertising, is similar to the capabilities now found on some Internet services, where single viewers based on their profiles can be targeted with banner ads and interstitials or email. At the same time, Internet advertising is increasing its use of rich media (defined as 20-Kbytes/sec or above), in an attempt to create the type of powerful and effective images we associated with television advertising. Sometimes because of bandwidth limitations and often because of a mistaken philosophy, these ads necessitate consumer interactions. The result, in contrast to television advertising, forces the consumer to interact, distorting the media's capability to deliver a message.

As a means to improve on targeting, designers of Web based offerings began to employ personalization solutions. On the Internet, where many traditional factors associated with purchasing decisions become less relevant, the ability to establish a one to one relationship with a consumer is paramount. Similarly, it is most desirable to offer, if possible, service and products reflecting that one-on-one relationship. To cite an example, Dell Computer allowed customers to build their own computers (mass customization) on the Web, instead of pre-building several different models for different target markets (targeting). Dell and other companies employed sophisticated customer relationship management (CRM) solutions based on general and proprietary technologies.

These CRM solutions, based on a variety of existing technologies, personalize offerings by using a combination of information gathered from the consumers visiting web sites. Such information is typically gathered by asking questions, tracking navigation and purchasing behavior, as well as from information gathered elsewhere.

Yet another step in the enhancement of advertising has been taken recently, as reported in the press. For example, Enliven of Waltham, Mass., offers real-time, database connection capabilities that let advertisers present up-to-the-minute information in Enliven-activated ads. Advertisers can present live information from a database source to a consumer viewing the ad with a proprietary, Java-based viewer. When merged with a marketing database such as TrueMatch, profile-based ad campaign targeting becomes possible. An advertiser creates a template into which graphics and text are inserted, according to the demographic information available about the user. However, even with the additional consideration of demographic information for real-time selection of advertising components, the templates provide a limited capability to effect enhanced advertising. This known system does not include any capability to modify or incorporate video materials into the advertisements, thus depriving the advertisers of the rich menu of video-oriented raw materials from which to draw. This leaves the viewer with little more than an interactive banner ad, perhaps with primitive "effects" that happens to have been "tailored" for publication to that user. There is no capability to change the tempo, music, narration, lighting, or any other elements of the advertising that have been proven successful in gaining the viewer attention the advertisers desire.

Further, even with known interactive personalization solutions in place, text and graphics solutions cannot compete with the masterful ability of video and audio to generate interest, create brand awareness, or product image. Television advertising agencies are master storytellers, using the types of narrative that people respond to so well. Although the Internet is a powerful medium on which to personalize dynamic offerings it lacks the power of traditional television which uses the richest of media to present powerful 30-second stories. The Internet is, by form, an interactive media, with the user typically controlling the type of message received. If the user can control the media message, either through explicit commands about what type of information the user reveals, or alternatively what information the user receives, the power of narrative story telling to a passive and receptive audience is lost.

SUMMARY OF THE INVENTION

The present invention is directed towards a system and method for dynamically creating individualized, multi-media messages for delivery to an intended audience, which can be specific groups or individuals. A message, story, or advertisement is assembled on demand, based upon rules applied to each user's profile data and the available library of media segments. The narrative framework for the final personalized message is a story as defined by a message campaign. The message campaign includes a message template and a collection of media segments. The media segments are selected and then assembled to produce the final personalized message at assembly time. Specific media segments are selected and merged according to the message template and information about the viewer derived from a user profile. The information from the user profile is interpreted by an expert rule system to determine which of several potential media segments to select for use in the personalized message. The merged composite is then encoded to match the distribution media and forwarded to the user for viewing.

Although the operation of the present invention includes the ability to assemble and convey a message upon demand, an advantage is the ability to match the presentation options with an educated and timely assessment of the target audience according to a number of templates. A campaign plan defines what the target group is (entity qualification), and what individual viewer information is relevant (entity profile) for target entities within the target group. Additional factors include the selection of input databases, target distribution channels, and environmental factors (weather, current interest rates, etc.). A message resource library contains the collection of video, audio, and other elements necessary to assemble the whole range of different messages based upon the message template. Message library resources include not only the varied clips necessary for each selection point of the template, but also variations triggered by changes in the monitored environmental factors, as well as synthesized speech and visual constructs to meet individual profile requirements.

Assembly of the message according to the present invention is based upon a message template which embodies the rules for selection and combination of the most current message library resources according to the entity profile at the scheduled time of message production. The present invention allows automated dynamic message assembly at any point up to seconds before delivery, based upon entity and environmental factors that are in constant flux, yet combined in a manner that addresses the communicative objectives of the campaign. A master task scheduler is defined according to the campaign requirements to control and coordinate all activities of the creation of the viewer profiles, message resource library, and message assembly.

The present invention includes the ability to edit and use scene or segment substitutions, choice of narrators and language, music changes or substitutions, audio effects, text and graphic overlays, speed changes, background changes, word or phrase insertions, more complex story changes, utilization of video libraries, digital video effects (DVE's) and transitions, and seamless synthetic voices, characters, and studio sets. Many of these scenes or segments may also be modified at message assembly time according to the selected environmental inputs, or interpretation of individual viewer inputs.

Advantages of the present invention include message creation upon order, not by forecast, with story-driven message assembly tailored to the individual and any combination of information known about the target viewer and the present environment. A new marketing paradigm is created, with the focus on differentiating customers, not just products. This in turn creates new opportunities for increasing customer interest, satisfaction, and retention of the campaign message.

Other advantages include the automated real-time creation of the message, which solves problems of timeliness and personal privacy. Computers, not humans compose the final form of the ad from the raw materials and previously generated templates.

Other advantages of the present invention include a system and method for gathering user profile information from a variety of different sources and databases, and processing the user profile information by a profiler which uses rules of assembly for creating a format usable by the message creation system.

Other advantages of the present invention include a system for creating templates with multiple insertable media features to create a personalized message for an individual or group. The number or type of insertable media features is not limited. For example, every element of a television commercial may be selected (or dynamically created) to fill in a template, including background view (such as a city skyline, and seasonal choices as well), music (background and jingles), language and accent of narrative, the choice of what narrative to add, the product being shown (for example a car or truck), the appearance of the product (for example the color of a car or accessorizations), selectable video of real actors, the length the commercial runs, any screen over text, etc. The media segments may all be created with the initial template, or created afterwards, including new media segments based on current events, but which are used in a template which has been in use for some time.

Another advantage is an expert rule base which allows the selection of proper media features for an individual, based on collected information about the individual. The expert rule base is able to use incomplete data or knowledge to make appropriate decisions about selecting media segments for an individual. The expert rule base can also make inferences about an individual based on available data.

Yet another advantage of the present invention is a highly flexible delivery system and method. The media messages may be assembled at any time during the process, anywhere from the time the message template and media segments are created, or up to and including real-time delivery where the media message is created and shown to the individual. Further the media message may be created at many different places, both centralized and decentralized, from the studio, to local station or web site, on a satellite, at a syndication station, at a cable television central office, neighborhood network, or even by a satellite receiver or cable box inside a viewer's home. Still further, the choice of delivery mediums is extremely varied, from prerecorded video tapes, DVDs, CDs etc. which are sent to an individual, to live feed through a cable system, internet connections, satellite link, RF towers, line RF signals, cell phones etc.

BRIEF DESCRIPTION OF THE DRAWINGS

The foregoing and other features and advantages of the present invention will be more fully understood from the following detailed description of illustrative embodiments, taken in conjunction with the accompanying drawings in which.

DETAILED DESCRIPTION

Figure 1:
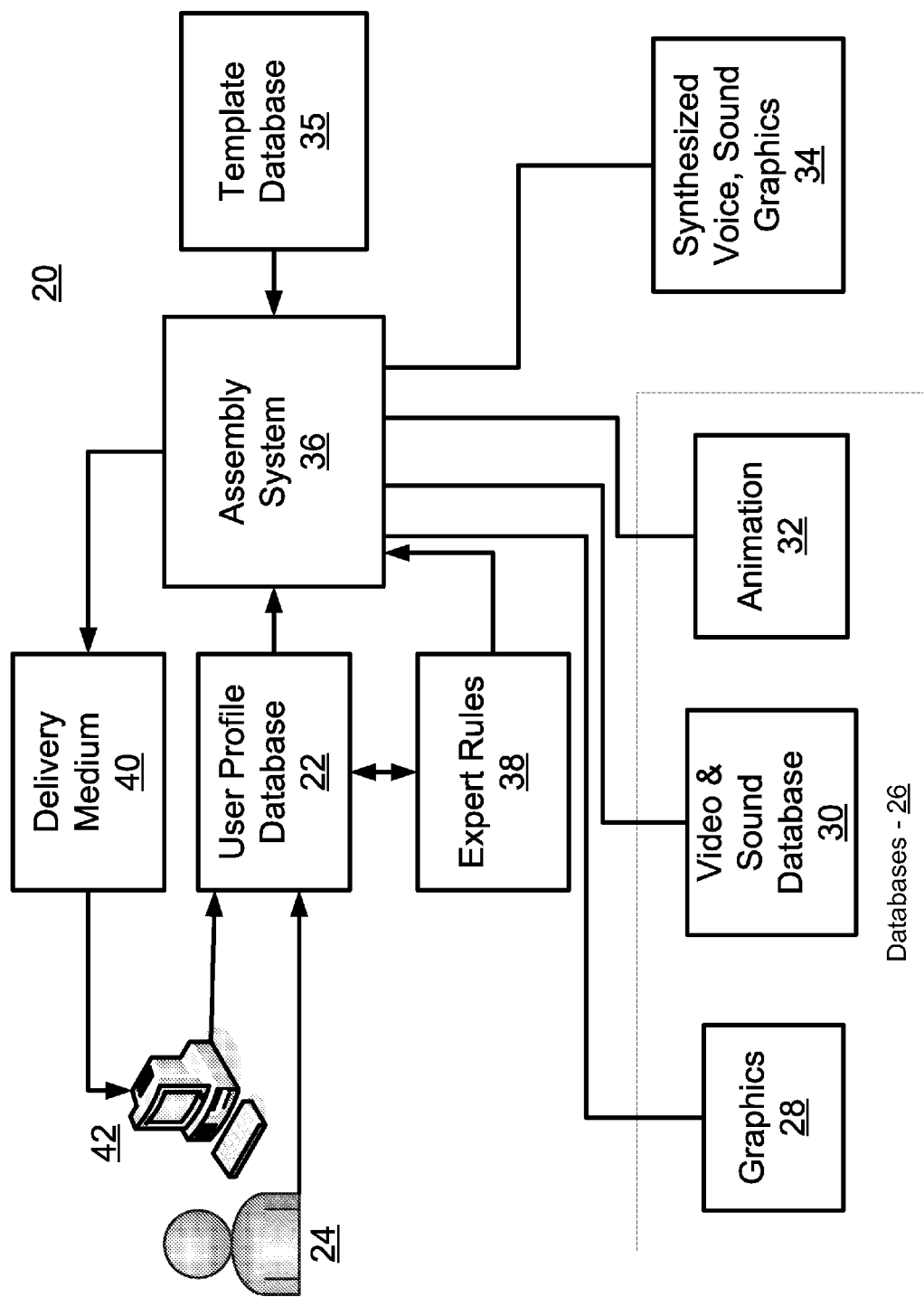
FIG. 1 is a block diagram of a system according to the present invention.

A system 20 for personal message creation and delivery according to the present invention is shown in FIG. 1. A user profile database 22 includes information regarding an individual 24. This user profile database 22 can be in any form, including a proprietary database of information owned by one entity, or publicly available information at one or at multiple locations, including information from user interactions on web sites or shopping networks. For example, the database may be a subscriber database accessed by the system 20 on a per-transaction system. The user profile database may contain any type of information regarding the individual 24, including demographics, address, monetary income, political affiliations, known preferences, buying patterns etc.

A template database 35 includes message templates which reflects the story, or message that the message creator or provider desires to convey to the audience. This message is described in terms of a "campaign", in that the message may be any type of message from a product advertisement, to a political message or informative message which may be tailored for each individual or group receiver. Details regarding the creation of a campaign will be described below.

One or more libraries or databases 26 include media segments which are used to assemble the personalized message. The databases 26 include a compendium of elements that may be broadly categorized as graphics 28, video and sound segments 30, and animation 32. These media segments may be part of a general library of available material, for example pictures of individual city skylines, attractions, or natural scenery for use in backgrounds. Alternatively, media segments may be generally or specifically created for a certain message campaign. For example, in an automobile advertisement, several media segments showing a certain automobile model in different colors may be provided, which are to be inserted into a media template from the template database 35 at an appropriate location. Which media segment is selected for insertion depends on user 24 information, together with the media template specifications, as will be discussed below.

Similarly, the database for video and sound 30 and animation 32 may include both "stock footage" which are available as needed by any message campaign; and specific message campaign material created and stored for a particular campaign. Animation includes any type of animation such as cartoon characters and logos etc.

In addition to the resource library, the system according to the present invention is able to synthesize additional elements 34 as needed during message creation, thereby providing increased flexibility. Such synthesized elements include sound such as synthesized speech, music, background sounds, and graphics such as text, background filler, visual objects (including color variations thereof), and visual effects (including dissolves, morphing of objects, etc.).

The personalized messages are assembled by an assembly system 36. The assembly system receives a message template from the template database 35, and uses media segments from the databases 26 to put together the message. The assembly system 36 receives input on the user 24 from the user profile database 22, and also receives input from expert rules 38, which interpret the user profile data, and direct the assembly system 36 to select which particular segments from the databases 26 to combine for the personalized media message. The expert rules 38 system is capable of interpreting user profile data from many different sources and in many different formats. The expert rules 38 system is also capable of making decisions based on incomplete user profile data, providing logical "fallback" selections as necessary. The expert rules 38 system will be described in detail below.

The assembled personalized message is encoded for a delivery medium 40, and then delivered to the individual viewer 24, typically by a display device 42, which can be any of various types of receiver including television, computer monitor, radio, phone etc. The delivery medium can be any of various types of media, including prerecorded video tapes, DVDs, CDs etc. which are sent to an individual, or live feed through a cable system, interne connections, satellite link, RF towers, line RF signals, cell phones and the like. As the present invention facilitates real-time creation, personalized messages to individuals may be delivered in many different ways, based on the user profile. For example, an individual 24 with a satellite connection would receive a distribution in a format different from another individual 24 receiving a media message for the same campaign, but delivered by the interne. More detail regarding the delivery medium 40 will be provided below.

Figure 2:
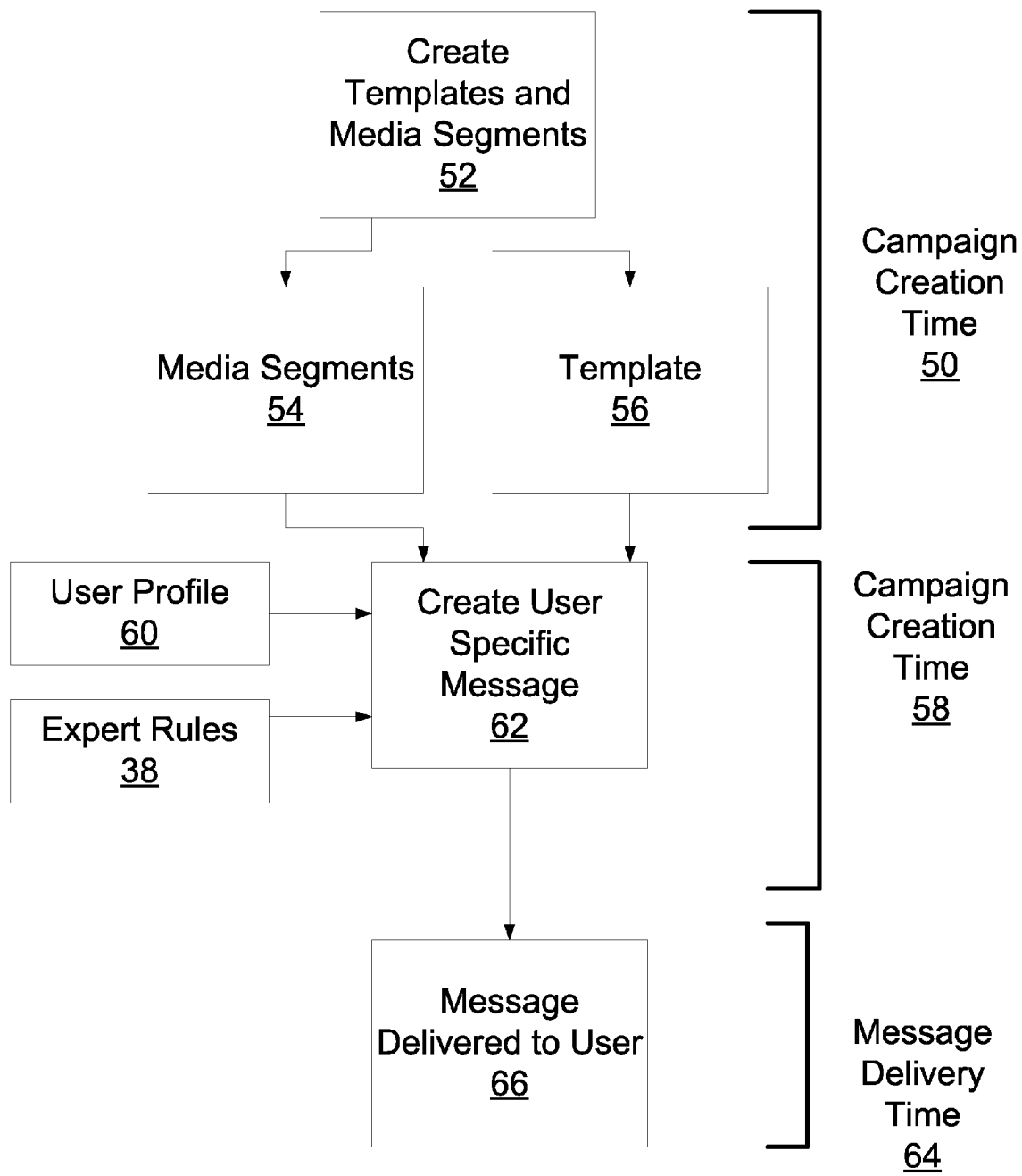
FIG. 2 is a flow chart showing an overview of timing of media creation according to the present invention.

A campaign message process according to the present invention are outlined in FIG. 2. Campaign message programs are divided in three basic stages: message creation time 50, assembly time 58, and delivery time 64. During the campaign creation time 50, the producers define and create the message templates 56 and also create or select media segments 54 the system will need for generation of the personalized messages or advertisements, step 52. The message template 56 is the framework which holds the story together. Results of the creation step are stored in the template database 35 and the message resource library 26 as a set of message templates 56 and media segments 54.

At message assembly time 58, the present invention uses information from the user profile 60, message template 56 and media segments 54 to create the personalized message for the specific user 24, step 62. The system uses expert rules 38 to assist in the process.

The next step 66 is at message delivery time 64, where the personalized message is presented to the user 24. This presentation may involve transmitting the message, or placing the message on some type of media. As previously described, message creation time 58 and message delivery time 64 may be contemporaneous, in that the message is created on the fly, or "just in time".

Figure 3:
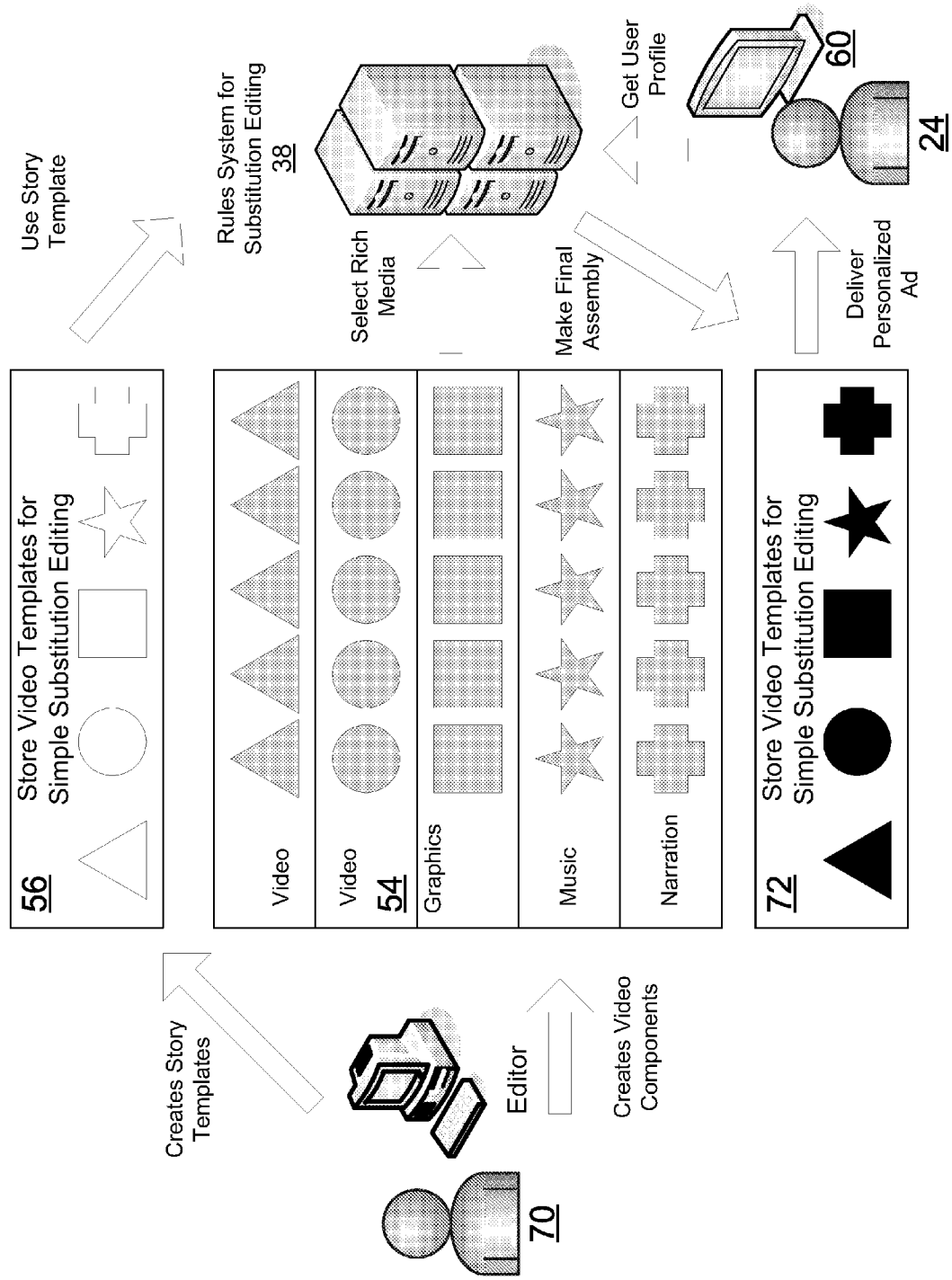
FIG. 3 is an overview of assembly of components to produce a media message according to one embodiment of the present invention.

FIG. 3 illustrates an embodiment of the invention in which substitution editing is implemented. A producer or editor working at an editing station 70 creates a message template 56 comprised of descriptions of different types of multi-media materials such as video, graphics, music and narration. The editor also creates or selects the media segments and consolidates them in the selected storage or database 54. User profiles 60 about the user 24 are obtained and fed to a rules system 38 for substitution editing. The rules system then selects raw materials from the media segments database 54 according to the message template 56 and user profile 60 and combines them to form a completed personalized message 72 that is delivered to the viewer 24.

Figure 4:
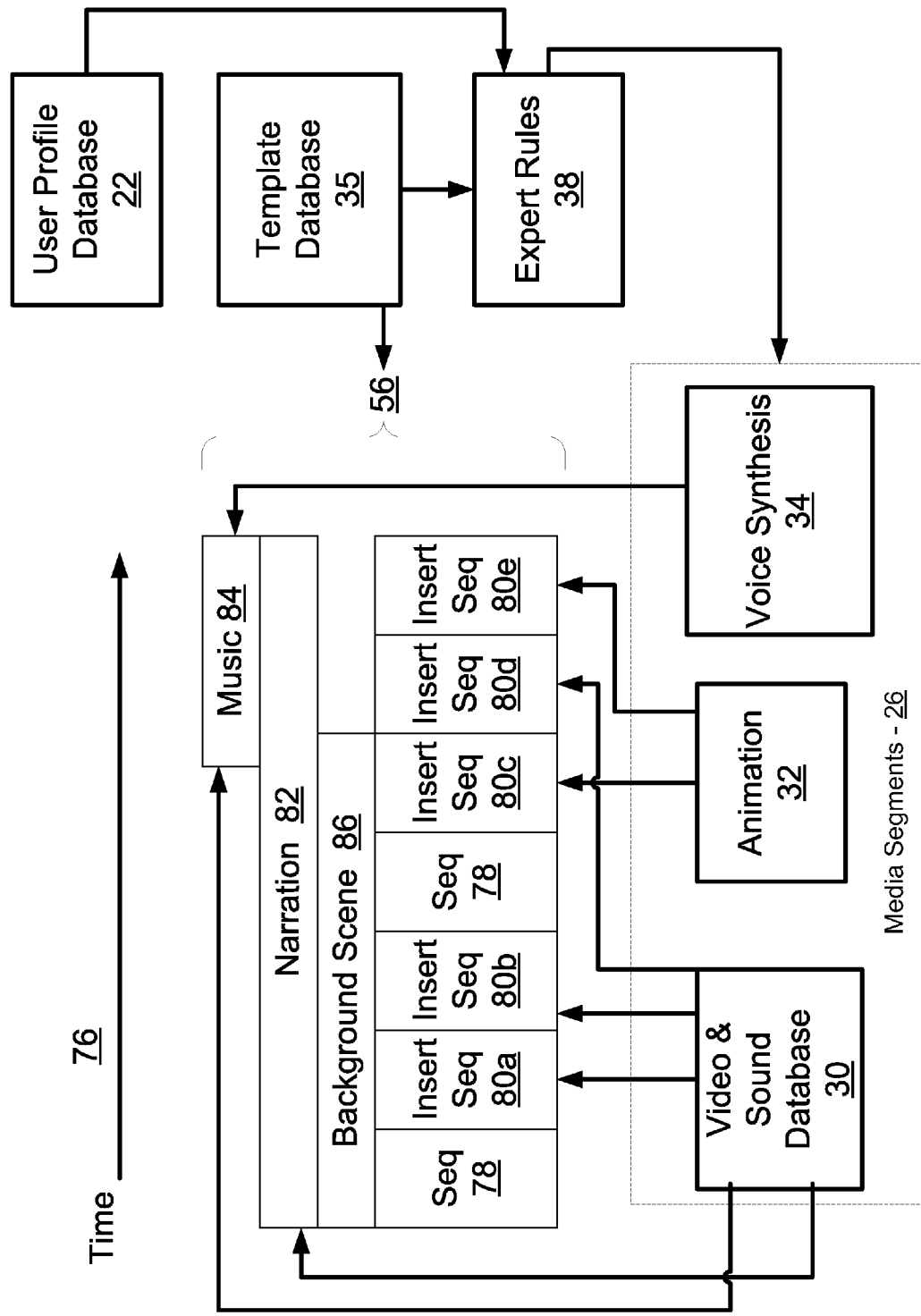
FIG. 4 is a more detailed diagram of assembly of components as overviewed in FIG. 3.

FIG. 4 provides a more detailed view of the assembly stage according to an embodiment of the present invention for rules based substitution editing. A message template 56 is obtained from the message template database 35. The message template 56 describes a framework to create and complete a personalized message 72 for the selected individual 24. The message template 56 runs for a certain length of time, as shown by arrow 76. The final running time of the personalized message may vary, as according to the present invention, the message can be diversified on many levels, including short messages or very long messages, as appropriate for the individual 24.

The message template 56 may include both predefined sequences 78 and insertable sequences 80. Predefined sequences 78 are media segments which are common to all final personalized messages 72, in that they do not vary based on the individual 24. In the example message template 56, the first sequence 78 is a predefined sequence. In this presented embodiment, the predefined sequences are stored in the media segment database 26, and inserted at the appropriate locations in the message template 56. The predefined sequences 78 only differ in the same predefined sequence 78 is always selected for that location in the personalized message. Alternatively, the predefined sequences may be stored or linked directly into the appropriate location in the message template 56.

The other sequences are insertable sequences 80, which are filled in as directed by the rule system 38. The rule system 38 receives information from the template database 35 regarding the message template 56 being assembled, and also receives user profile information 22. The rule system then determines the appropriate media segments to insert into the insertable sequences 80 of the message template 56. For example, the first insertable sequence 80*a* is video selected from the video and sound database 30. A next insertable sequence 80*b* is also selected from the video and sound database 30. Continuing with the present example, a predefined sequence 78 is then followed by an insertable sequence 80*c* comprising animation from animation database 32. The next insertable sequence 80*d* is another video segment from the video and sound database 30, followed by a final insertable sequence from the animation database 32.

Also the predefined sequences 78 and insertable sequences 80 are shown in the present example with no overlap, however the present invention is not limited to orthogonal assembling of media segments. All elements of the personalized message can be controlled, and combined in various forms to provide powerful customization. For example, a background scene 86 such as a geographic landscape, is selected from the video and sound database 30 and used as a common background for the predefined segments 78 while insertable segments 80 are added to the message template 56. The background scene 86 is not used for the end of the personalized message, in that the insertable sequences 80*d* and 80*e* do not use a background (or already have a background). In similar techniques, various physical elements may be inserted into standard video, for example the video and sound database 30 can include footage of several different actors providing dialog for a message, and the rule system 38 selects footage of a certain actor based on information from the user profile 22. The selected actor footage is then added as foreground in an insertable sequence 80. In this way, every element of a personalized message can be customized.

Additional elements such as music 84 can be added to the personalized message as appropriate. In the present example, music 84 is supplied for the end of the personalized message. The rule system 38 selects among the choices of music provided for insertion into the message template 56, and music is added from the video and sound database 30.

Another element provided for the message template 56 is narration 82, which for the present example is synthesized voice 34 which is created dynamically as needed. Alternatively, prerecorded speech can be used, including multiple selections of prerecorded speech, which is selected according to criteria processed by the rule system 38. For example, prerecorded speech may be in different languages, or with regional accents, allowing the present invention to customize the message with different rich media features for the message creation.

Figure 5:
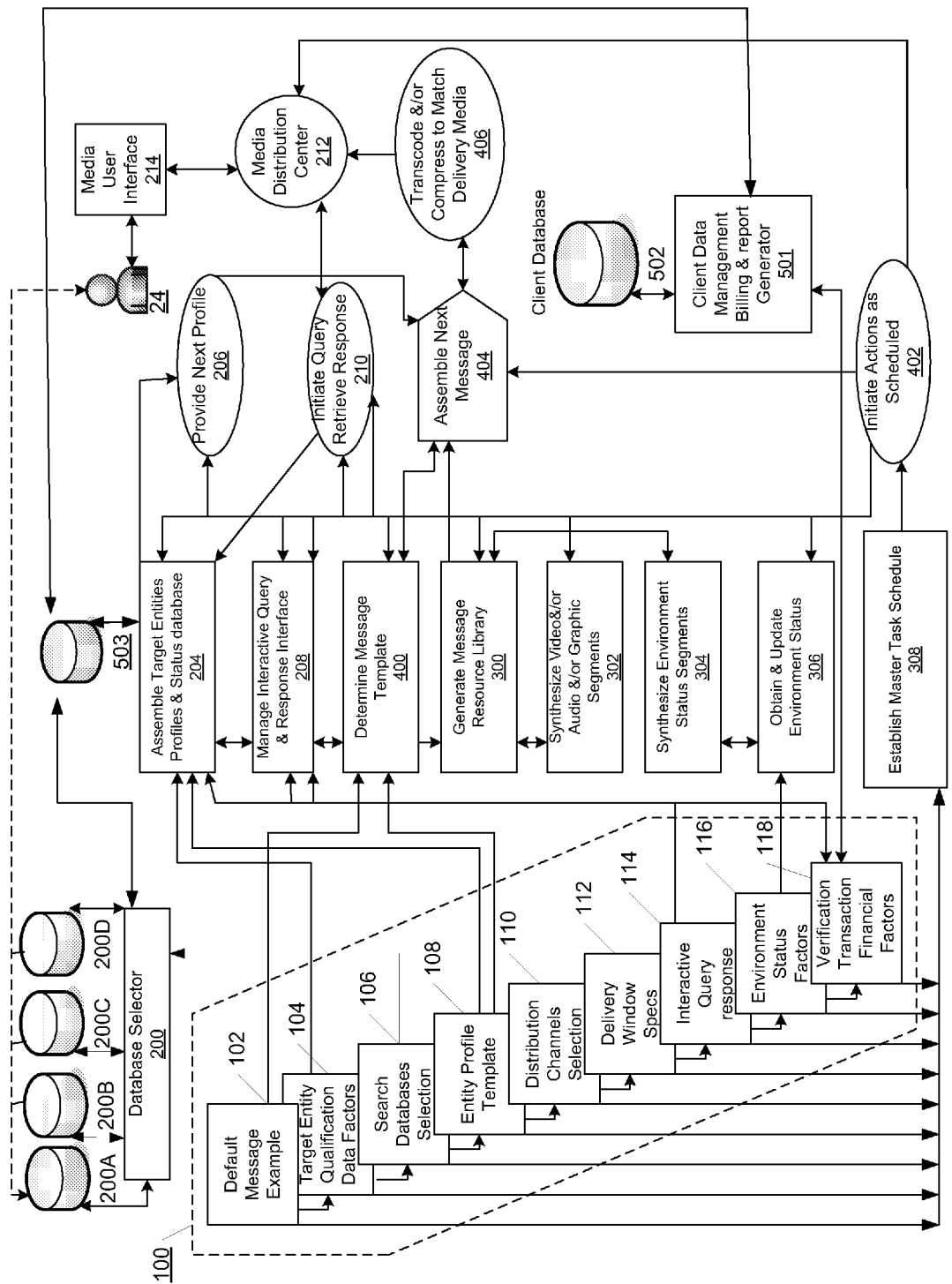
FIG. 5 is a block flow diagram of an illustrative embodiment of a system according to the present invention.

FIG. 5 shows an illustrative embodiment in which additional features of the invention are described, with details of the process of creating a campaign. Prior to the creation of a message or advertisement, a client works with the system operators to determine a formalized campaign plan 100 to be executed. The campaign plan is used by the client to define the communications task the client wishes to accomplish and, in turn, it drives all of the processes necessary to achieve the program.

The first step is to create rich media video composition example or examples of the message that the client wishes to deliver to the audience. Typically it will be of the prescribed time duration and exhibit one complete message as an example of one specific version of the intended communication. This provides the starting point for later construction of a message template or templates 56, FIG. 2 and a resource library (media segments 54) from which the various personalized versions of this message are assembled.

The next step involves target entity qualification data factors 104 FIG. 5. The client delineates the general characteristics of the members of the audience to which the message is to be delivered. It may include, for instance, appropriate media connection, family status, financial category, age grouping, regional location, etc. This information is used in the database searches to acquire the list of individuals or entities to which the message will be distributed.

The next step involves search databases selection 106, and allows the client to define the limits of the search by identifying the databases 200 which are to be searched for data input. The entity profile database itself can be an input source built up interactively with the target entity.

The next step involves creating an entity profile template 108. The entity profile template 108 is a complete or partial definition of the information about each individual or entity that is to be acquired by the search as well as a pattern for the formatting of this data. It is used in the generation of the target entities profiles and status database which not only governs the resources and rules used to assemble each personalized message, but also is the repository for all of the interactive information received from the target user 24.

The next step, called distribution channels selection 110, is defined by the campaign. It allows the client to decide what media outlet or outlet priority he wishes to use to communicate with his target audience.

The next step is the definition of the delivery window specifications 112. These specifications define a time duration over which the campaign will be executed as well as if special time and/or programmatic related conditions are required. This information is the starting point for generating a master task schedule 118.

The next section involves interactive query response 114, whish is used to define any interactive transactions that may be utilized by the campaign such as acquiring additional information about the target entity, polling responses, purchase transactions, etc.

The next section involves environment status factors 116 and refers to establishing a description for existing environmental factors, for example weather, current interest rates, current travel fares, etc. that need to be updated at the time the message is transmitted to enhance the timeliness and relevance of the personalized communication packets.

The final section involves verification transaction financial factors 118, and is used to define all of the financial factors such as verification, billing, purchase transactions, etc. which must be monitored 501 and recorded 502. Also any actions to be taken as a result of this information are indicated in this section 118. At this point, the client's work in configuring a campaign plan 100 is completed.

The next set of actions are directed towards preliminary service activities. The first step 204 in this process is to assemble the target entities profiles and status database 503. This is the working database for this illustrative embodiment. It relies on the database selector 200 which is driven by the campaign plan 100 to determine which databases 200 to search. This database 503 should be completed before any of the other activities may proceed since the information it contains is used by the other activities to complete their tasks. It may, however, be updated at a later time by the ongoing service activities including the query response tasks 210. The search is set up utilizing the target entity qualification factors 104 to decide which data records to retrieve and the entity profile template 108 to select and format the data for each individual or entity. It reserves fields for whatever polling, verification, transaction, or financial etc. information is required. This database 503 is the repository for all of the information generated by this embodiment about the target entities.

The next step 208 to be defined is the management of the query and response interface with the target entity. When present, this activity allows two way communication on a limited basis with the individual 24 who receives the message. It typically requires special capability embedded in the media distribution network. It also needs to be able to distinguish the identity of the sender and associate his responses with his data profile. Timing is coordinated by the Master Task Schedule 308.

The process of determining the message template 400 is an important part of this embodiment. The template embodies the rules for assembling personalized messages utilizing the profiles data and the resource library 26 FIG. 1. An operations diagram for this activity will be described in reference to FIG. 6. It typically relies on the range and detail of the formatted profile information, the campaign plan example message, and the requirements for any query/response activity that is specified.

Once the message template has been constructed, then a message resource library 26 is created, step 300 FIG. 5. This resource library 26 contains the alternate clips of video and audio needed to assemble the whole range of different messages. One sub-process 304 has the instructions to receive environmental information, and synthesize the video and/or audio segments required by the message template for timely individualized message assembly. Another sub-process 302 provides the ability to synthesize, on the fly, artificial speech and visual constructs to meet the individual specifications indicated by the different entity profiles. Obtaining and maintaining current environmental information is a separate parallel operation 306 that is constantly polling the appropriate information channels and making the acquired data available on demand to the unit 304 that synthesizes this status information for the resource library. This information can be obtained from places such as the internet, the weather service, a news service, a private interne or intranet, etc.

A next step 308 is to establish the master task schedule. The information gathered by the campaign plan 100 is formatted such that it outlines the process flow and coordination requirements for each step of the ongoing service project from initiation to completion. This data is utilized to establish the master task schedule which controls and coordinates all of the activities and events as soon as its project "clock" is started.

The next set of actions are directed towards service execution and delivery. After the preliminary service activities have been executed (except for timely updates) the schedule "clock" 402 may be started. This controls the scheduled generation and delivery of the projects personalized messages to all of the profile entities in the target entities profiles & status data base 503. Execution is a continuous step and repeat process which can deliver on the fly or accumulate appropriate batches for simultaneous delivery. Each step begins with the presentation of the next profile 206 to the assembly node 404 which uses this profile to select and assemble the correct material from the resource library into its "slot" in the appropriate selected message template. It then sends the assembled message on to the transcoding and/or compressing operation 406 which delivers a video stream that matches the specifications for the delivery media. These video messages are transported to the chosen media distribution center 212 for delivery at the scheduled time to the media user interface 214 which communicates with each appropriate target entity 214.

When creating the campaign plan, the campaign manager working with the client to encode a default message example 102. The example serves as a message template containing a rich media video composition of the message that the client wishes to deliver to his audience. The example is of the prescribed duration and exhibits one complete advertising or other message as an example of one specific version of the intended communication to be delivered. This provides the starting point for later construction of a message template 400 and a resource library 300 from which the various personalized versions of the message are to be assembled.

The client delineates the general characteristics of the members of the audience to which he wishes his communication to be delivered. It may include for example appropriate media connection criteria, family status, financial category, age group, regional location, etc. The resulting set of target entity qualification data factors 104 is used in database searches to acquire the list of individuals or entities to which the message will be distributed. Further criteria for search database selection 106 are also defined by the client.

An entity profile template 108 is also created as a complete definition of the information about each individual or entity that is to be acquired by the search as well as a pattern for the formatting of the retrieved data. This entity profile template 108 is also used in the generation of the target entities profiles and status database 204 which not only governs the resources and rules used to assemble each personalized message but also is the repository for all of the interactive information received from the target entity. A distribution channel selection 110 defines itself. This selection allows the client to decide what media outlet or outlets he wishes to use to communicate with his target audience.

Client campaign plans also define the delivery window specifications 112. These specifications define a time duration over which the campaign will be executed as well as when special time or programmatic related conditions are required. This information is the starting point for generating a Master schedule 308.

Interactive query responses 114 are defined where the campaign desires to acquire additional information about the target entity, poling responses, purchase transactions, etc. The client can also define environmental status factors 116. These factors will need to be updated at the time the message is transmitted to enhance the timeliness and relevance of these personalized communications packets. Examples include the weather in various places, current interest rates, current travel fares from place to place, etc.

As a final preparation for operations, the client and system operators define all of the verification transaction financial factors 118 which must be monitored and recorded. This element also includes definitions for any actions to be taken as a result of this information.

Once the campaign plan has been encoded, a set of preliminary service activities takes place in preparation of the elements necessary for the dynamic customization phase. The first activity is to assemble target entities profiles and status database 204. This is the working database for the whole current dynamic customization system. It relies on the database selector 200 which is driven by the search database selection 106 to determine which databases to search. This database 204 must be completed before any of the other activities may proceed, since the information it contains is used by the other activities to complete their tasks. It may, however, be updated at a later time by the ongoing service activities including the query response tasks. The search is set up utilizing the target entity qualification factors 104 to decide which data records to retrieve and the entity profile template 108 to select and format the data for each individual or entity. It reserves the fields for whatever polling, verification, transaction, or financial information is required. This database is the repository for all of the information generated by the system about the target entities.

The next activity in preliminary services is the management of the query and response interface 208 with the target user 24. When present as part of the campaign, this activity allows two-way communication on a limited basis with the individual who receives the message. Use of this feature may be implemented by the media distribution network, such as a set-top box interface, for example web TV. Preferably, the interface can distinguish the identity of the sender and associate his response with his data profile. The timing of any user interaction is coordinated by the master task schedule 308.

The process of determining the message template 400 is described below. The message template 400 embodies the rules for assembling personalized messages utilizing the profiles data 2b and the resource library. The message template process relies on the range and detail of the formatted profile information, the campaign plan example message, and the requirement for any specified query/response activity.

Once a message template has been constructed 400, then a resource library must be created 300. This library contains the alternative clips of video and audio needed to assemble the whole range of different messages. One sub-process assembles the whole range of different messages. Another sub-process receives environmental information 306 and synthesizes 304 the video and audio segments required by the message template for timely individualized message assembly. Another sub-process will provide the ability to synthesize 302, on the fly, artificial speech and visual constructs to meet the individual specifications indicated by the different entity profiles.

A separate process running in parallel obtains and maintains the environmental information 306 by constantly polling the appropriate information channels and making the acquired data available, on demand, to the synthesizer process 304 for the resource library 300. This information could be obtained from places such as the Internet, the weather service, a private intranet, local sensors, etc.

The information gathered in the campaign plan 100 must be formatted such that it outlines the process flow and coordination requirements for each step of the ongoing service project from initiation to completion. This data will be used to establish the master task schedule 308 which controls and coordinates all of the activities and events as soon as the project "clock" is started.

After the preliminary service activities have been executed (except for timely updates) the schedule "clock" is started. This controls the scheduled generation and delivery of the dynamically customized advertisements to all of the profile entities in the target entities profiles and status database 204. Execution is a continuous process of "step and repeat" which can deliver messages on demand or else accumulate appropriate batches for simultaneous delivery.

Each step begins with the presentation 206 of the next profile to the assembly node 404 which uses this profile to select and assemble the correct material from the resource library 300 into its "slot" in the message template 400. It then sends the assembled message on to the transcoding and compressing operation 406 which delivers a video stream that matches the specifications for the delivery media. These video messages are then transported to the chosen media distribution center 212 for delivery at the scheduled time to the media user interface 214 which communicates with each appropriate target user 24. The process is then repeated for the next profile 206 until all listed profiles are serviced.

Figure 6:
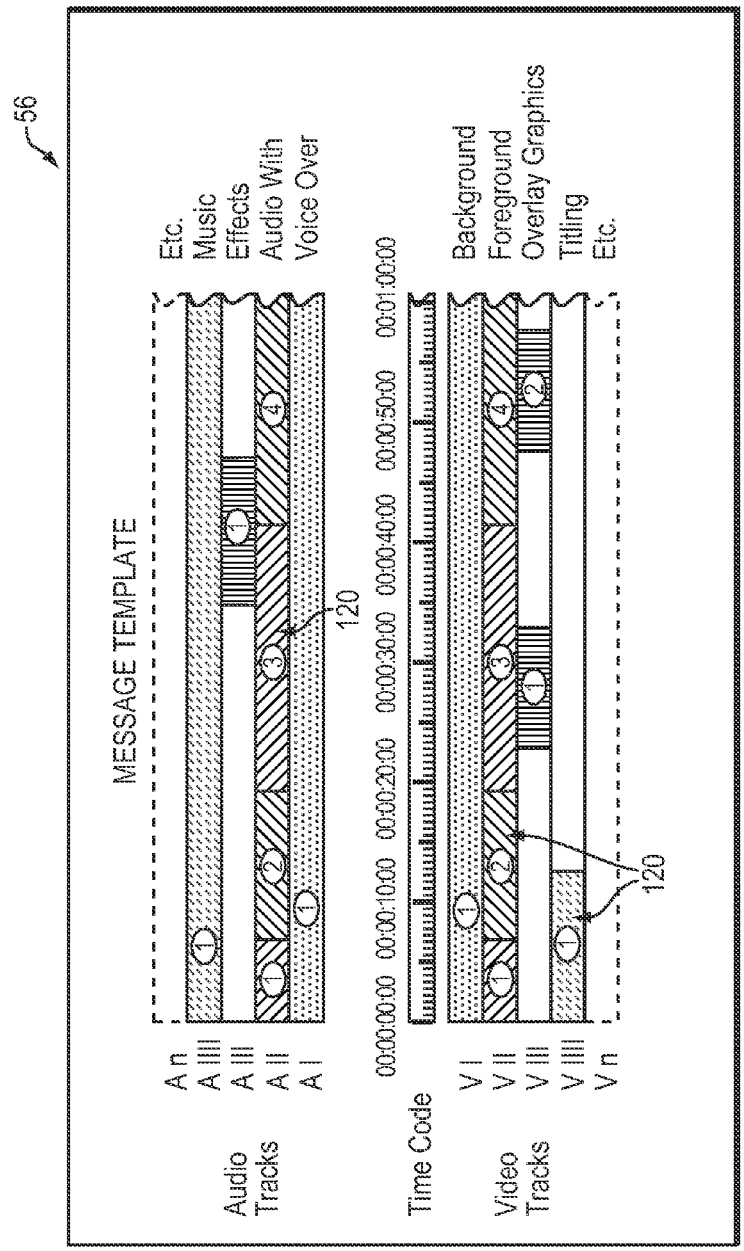
FIG. 6 provides details of an example message template according to the illustrative embodiment of FIG. 5.
Figure 7:
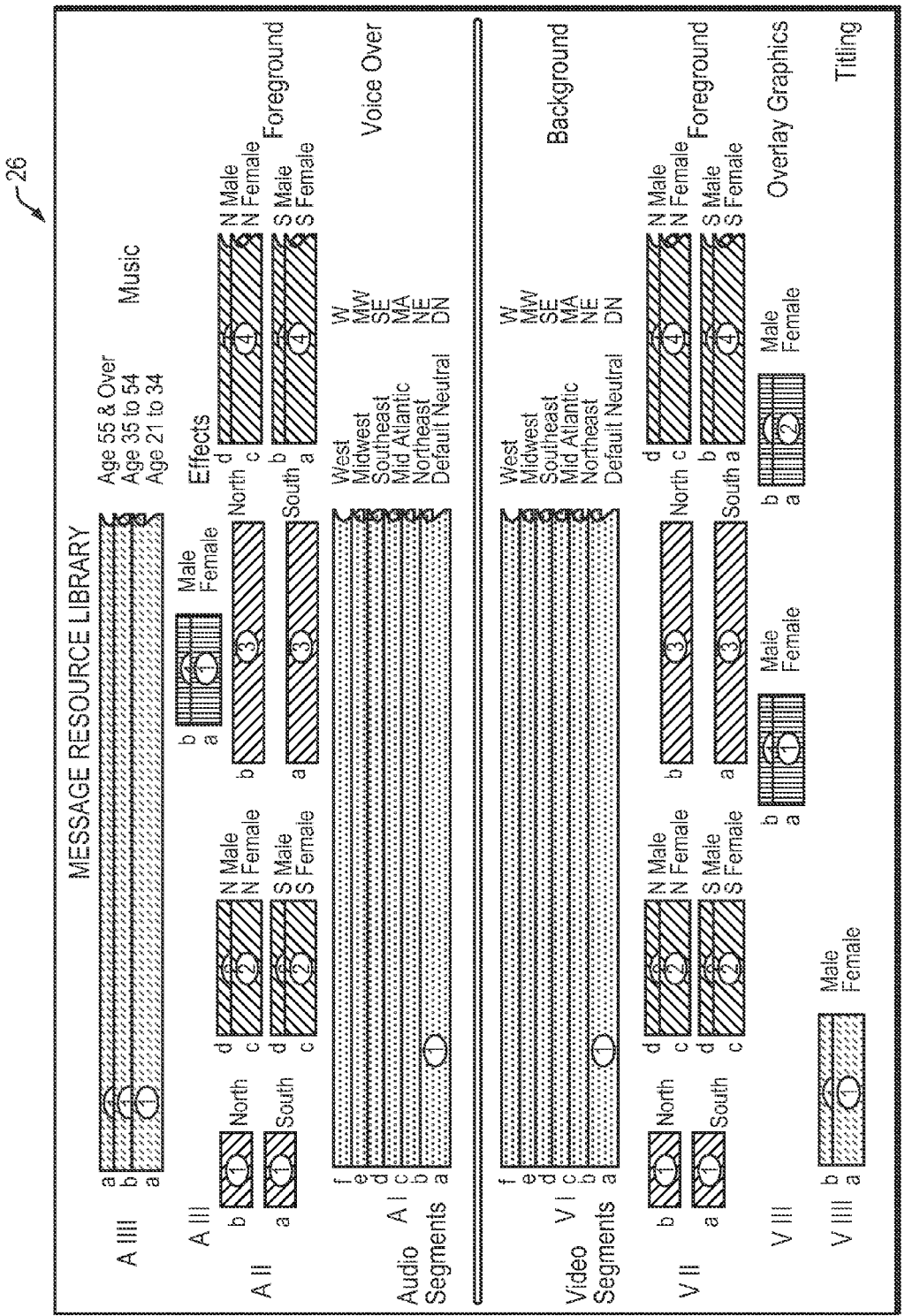
FIG. 7 provides details of an example message resource library associated with the message template of FIG. 6.

FIG. 6 illustrates a sample message template 56. The message template(s) 56 design is determined using information from the default message example 102 FIG. 5 and the general criteria that defines the entity profile template 108 together with any interactive information relevant to the message. The range of values for each media segment derives initially from the information given in the campaign plan 100 about the default message example 102 and its variations. Beyond that, the entity profile template 108 establishes the breadth of information sought for each profile category such that it will provide adequate information to customize the desired segments for the chosen entity. In addition, some information can be derived from the interactive responses of the client entity as well as from the updated environment status information provided to the message resource library databases 26. The message template 56 FIG. 6 is the mold into which the proper selection of resources are "poured" to form the specific message for the specific entity whose profile has been presented for assembly.

The message template or templates 56, together with the breadth of information established as previously described, forms the basis for generating the message resource library 26. Each defined media segment 54 for each video and audio track of the message template 56 requires at least one or more alternate segments 54 to be generated to provide the full range of variations required to cover all of the profile categories and the variation in category types. Alternatively, the message resource library can be updated with new alternate segments 54 and the expert rules 38 updated to provide finer granularity in customization based on feedback from initial use of the campaign. The expert rules 38 according to the present invention allow for continuous tweaking of the message assembly. The message resource library also keeps updated information on any current environmental status information needed to assemble the messages.

These video and audio segments will generally be stored on high capacity, high speed servers 200 FIG. 5, at the highest quality level needed by any of the target media through which the messages will be distributed. They are available to the assembly operation in "real time" for production "on the fly". Each segment 54 is sized to fit its template slot and have its own identity and time code location for rapid retrieval by the assembly operation. In another embodiment, alternative segments for one template slot can vary in length, and the system automatically adjusts the final message to properly fit in the total time slot. Typically this is performed by shortening a following segment, which may be created to allow such variations in length.

Figure 8:
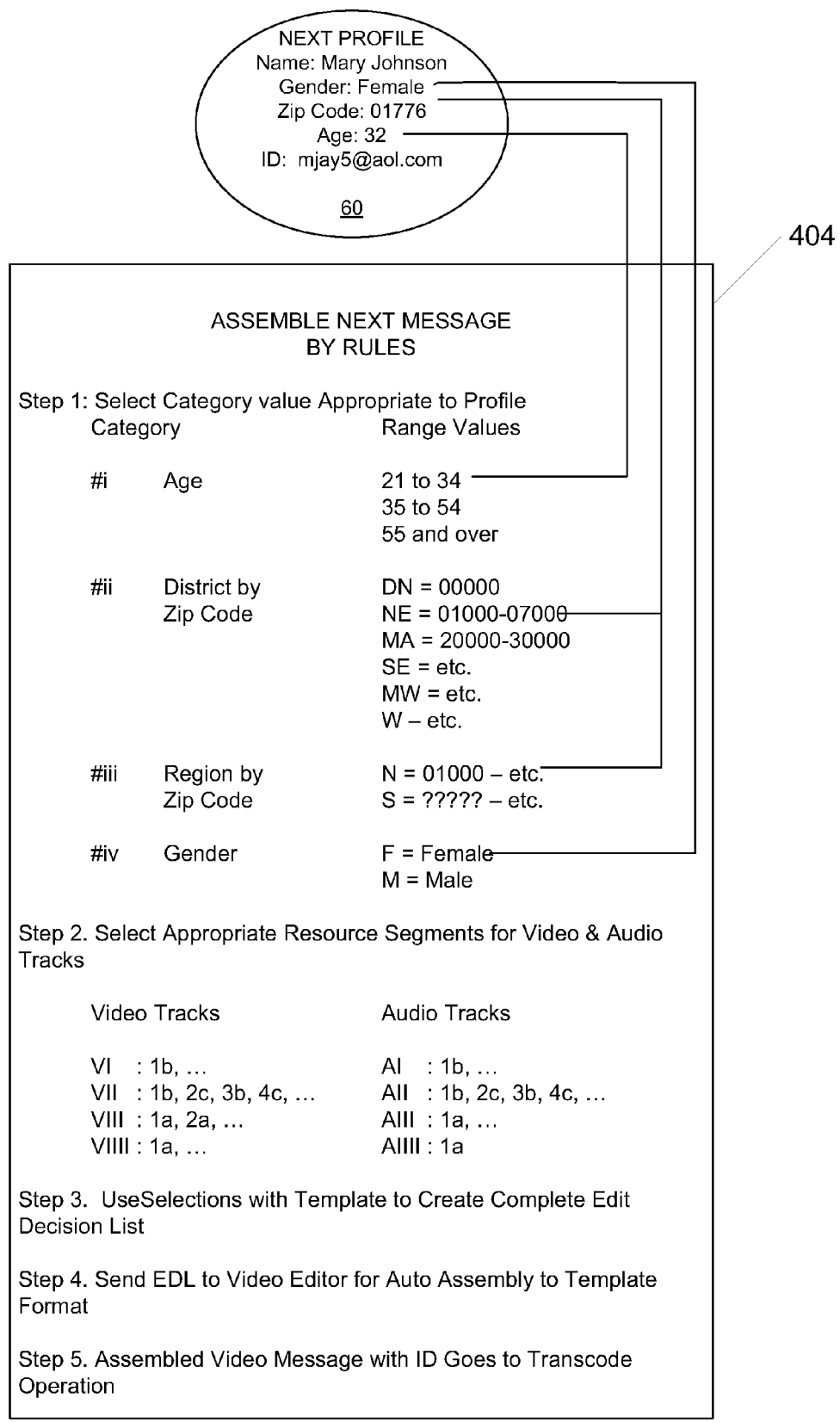
FIG. 8 illustrates assembly of a message according to example rules applied to the components of FIGS. 6 and 7.

The next profile 60 of a user 24, FIG. 5 for whom the current message is being customized is pulled from the target entities profiles & status database 503 that contains all of the data collected to "fill" the profile template 60 FIG. 8 for each of the entities selected for the current campaign. This profile 60 need not be limited to passive accretion of facts but may include information derived by sophisticated behavior analyze of buying habits etc. Each profile 60 is presented to the assembly operation to be used as a basis for selecting the media segments 54 that are appropriate to this specific profile to be placed in each of the slots in the message template 56.

The assembly operation 404 proceeds in a rudimentary fashion by selecting each media segment 54 from its alternates by simply locating the segment in each category that includes the profile's value for that category and using the default segment when no information is available for that slot, as shown in FIG. 8. Alternatively, a more powerful form of selection is used based on a logical rules to evaluate several pieces of information for any selection including how to deal with gaps in the profile by evaluating and interpolating other available information. Some example computer code written in a variation of the Lisp programming language is presented in the Appendix.

The first stage of completion results in an edit decision list which is a set of instructions for the assembly of this specific message by a video editing function using the message resource library 26. This causes a high quality video stream of the message to be generated which is then sent together with its ID to the transcoding operation, which is described below.

Figure 9:
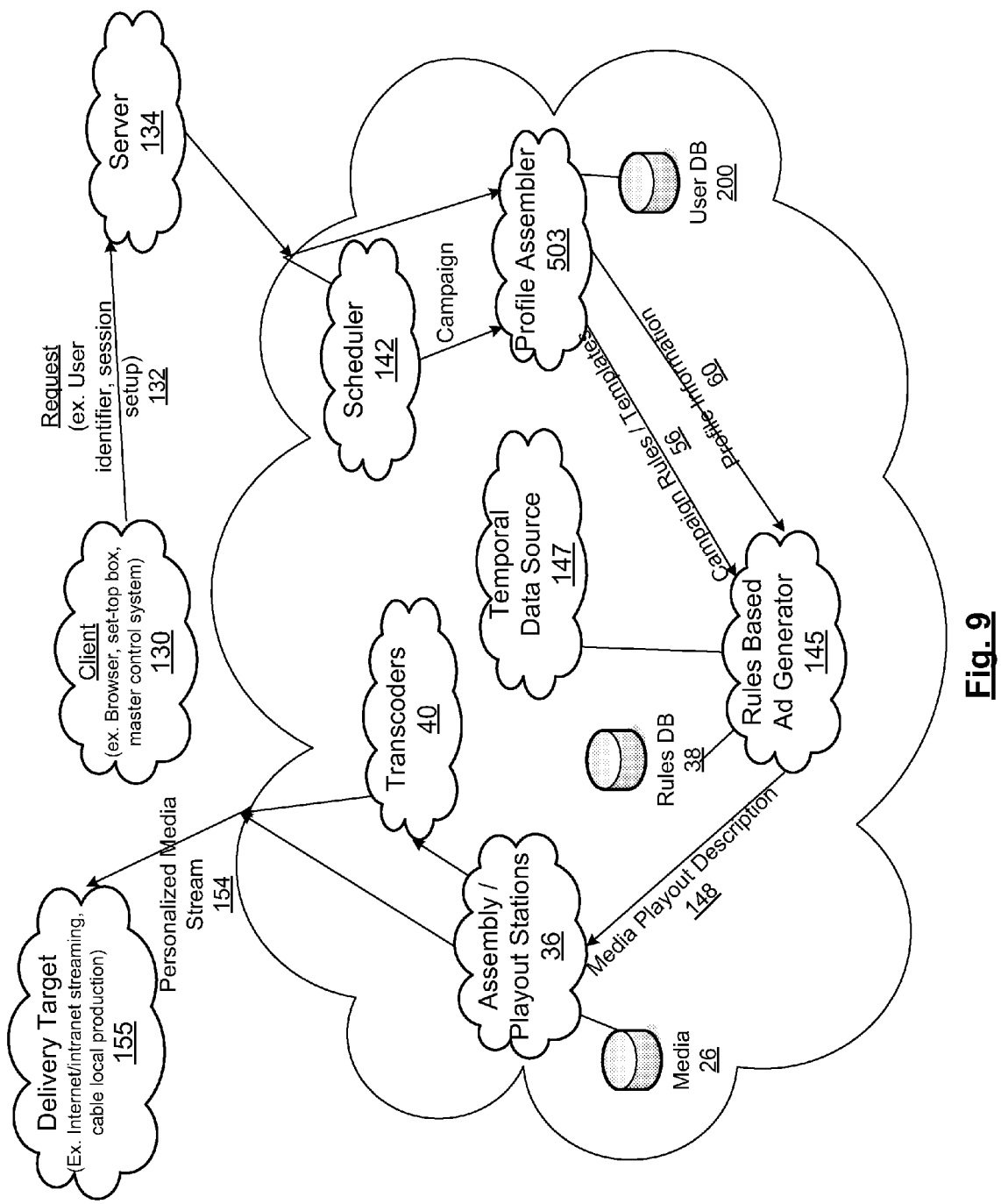
FIG. 9 is a block diagram of an embodiment of the present invention for personalized message delivery over an interne system.

Another embodiment of the present invention for delivering personalized messages is shown in FIG. 9. This embodiment is an example of personalized message creation as a service industry, where clients send requests electronically to a service provider, who creates the personalized message and sends the personalized message either back to the client, or directly to the user. The personalized message may be displayed to the user immediately, or alternatively, the personalized message may be stored by the requesting client to provide to the user at a later time, either by web page or by other delivery methods 155, such as hard media (video tapes, video disks, dvd etc). or by electronic means (email, cable TV, satellite etc.).

The client 130 sends a request, including a user identification to the server 134. The user identification 132 provides information identifying the user, to allow for searching and obtaining user profile information. A standard user identification such as a user email address, domain number or social security number may be used, or a specific user identification used or created by the client. The server sends a request to the system 20 which is providing the service. The server 134 also indicates a particular campaign to be used for creating the user-specific personalized message. A campaign scheduler 142 sets up and queues the creation of the personalized message by the system 20.

Upon commencement, the profile server 503 gathers profile information 60 on the user. The profile server 503 can obtain profile information from many sources, including databases 200, as previously described. The profile server 503 then sends the gathered information including the user profile information 60, message template 56 information and specific campaign rule information to the message generator 145. The message generator 145 uses expert rules 38 as well as other sources of environmental and temporal data 147 (such as weather, time, current events etc.) to select appropriate media segments for completion of the message template 56. The message generator then sends a media playout list 148 to the assembly system 36, which obtains the appropriate media segments from the databases 26 and produces the personalized message. Depending on the delivery requirements, the personalized message may be sent directly to the delivery target 155, or may be encoded by a media encoder 40 which performs any conversion or compression necessary to produce a deliverable personalized message.

Figure 10:
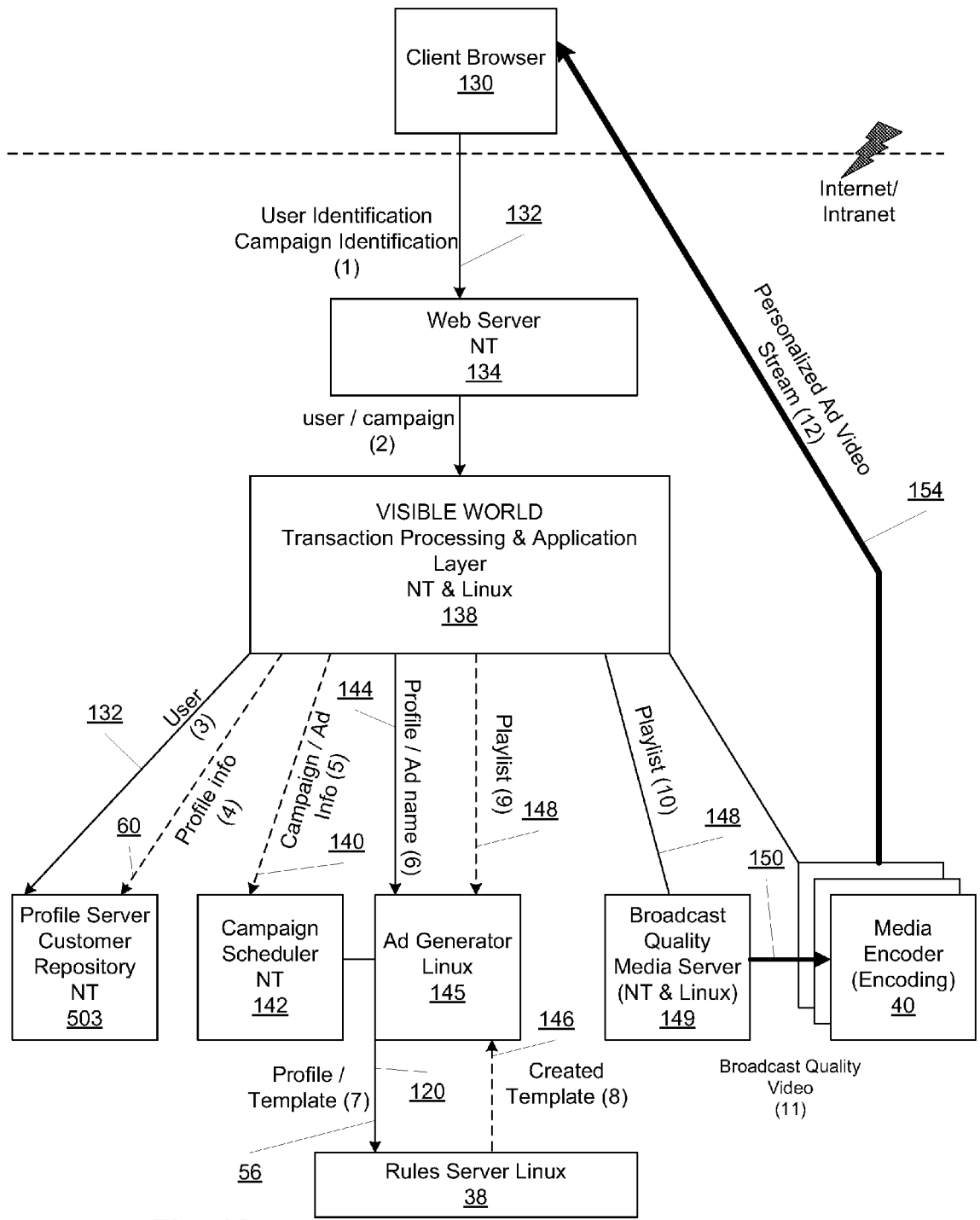
FIG. 10 is a block diagram providing more details of the embodiment of FIG. 9.

Another embodiment of the present invention is shown in FIG. 10. This embodiment is similar to the embodiment in FIG. 9, except with more focus on message creation and delivery over the internet or world wide web. This is an example of "just in time" creation on demand, to display to a user who is actively viewing a web site on which the personalized message will be immediately displayed.

Turning to FIG. 10, A client browser 130 sends a user identification 132 to the web server 134. The user identification 132 is sent along with a campaign identification, which indicates what campaign to use to create the personalized message for the user.

The web server 134 passes the received information on to the transaction processor 138, typically over an electronic connection such as the internet, a dedicated telephone connection etc. The transaction processor 138 oversees much of the operation of creating the personalized message, including sequencing of many of the steps in the operation, and bookkeeping for client records and billing. For creating the personalized message, the transaction processor 138 send the user identification 132 to the profile server 503, which gathers profile information 60 on the user, as previously described. This profile information 60 is returned to the transaction processor 138.

The transaction processor 138 sends the campaign identification to the campaign scheduler 142, which schedules and sets up tasks and actions to be performed in the personalized message creation. The campaign scheduler controls the performance of the message generator 145. The message generator 145 receives the profile information 60 and further information 144 (such as parameters associated with the campaign) from the transaction processor 138.

The message generator 145 provides the profile information 120 and message template 56 to the expert rules system 38, which is responsible for completing the message template 56 with selected media segments for each part of the template. The expert rules system 38 uses rules as previously described to determine the appropriate media segments. The completed template 146 is then returned to the message generator 145 which sends a media playout list 148 to the transaction processor 138.

The transaction processor 138 provides the media playout list 148 to the media server 149 which assembles all the media segments together to produce the video stream 150 of the personalized message. The video stream 150 is provided to the media encoder 40, to properly encode the video stream for delivery. In the present embodiment, this is an encoded video stream 154 which is sent to the client browser 130, for delivery to the user.

In this embodiment, the transaction processor 138, profile server 503, campaign scheduler 142, message generator 145 expert rules server 38, media server 149 and media encoder 40 run on separate general purpose computers running Windows NT or Linux. These computers are interconnected as appropriate for the location of each component and the bandwidth requirements for communication therebetween. Alternatively, several components may run on one machine as one application, or as separate processes.

In an alternative embodiment, the present invention may be implemented with a plurality of message templates for one campaign, with a template selection mechanism for selecting an appropriate template based on profile information for the end user, or on other factors. For example, if it is presently raining in a location where the end user is, a message template created with bad weather in mind may be selected over a "good" weather message template, or a generic template. These plurality of message templates may have common insertable message segments, or use different libraries of insertable message segments, or even have few or no insertable message segments.

Although the invention has been shown and described with respect to illustrative embodiments thereof, various other changes, omissions and additions in the form and detail thereof may be made therein without departing from the spirit and scope of the invention.

APPENDIX

```
;;;SAMPLE EXPERT RULE FOR PRESETTING A SET OF
USER-DEFINED AND
;;;ENVIRONMENT PARAMETERS
(define Mobil (user user_age user_language user_sex middle_age
user_card user_zip)
        (
            (age
                (cond
                            ((<user_age 13) child)
                            ((<user_age 20) teen)
                            ((<user_age 35) young)
                            ((<user_age 60) middle)
                            ((<user_age 85) senior)
                            (t elderly)
                )
            )
            (weather (getenv (weather user_zip)))
            (temperature (getenv (temperature user_zip)))
            (language user_language)
            (sex user_sex)
            (category
                (cond
                            ((and (equal user_language
German) (equal user_sex Male) (<user_age 35)) F)
                            ((equal user_card amex) E)
                            ((equal user_card mobil) D)
                            ((and (equal user_sex Male) (<
user_age 35)) A)
                            ((and (equal user_sex Female) (>
user_age 35)) C)
                            (t B)
                )
            )
        )
)
;;;; SAMPLE EXPERT CODE WHICH DEFINES A PLAYLIST
(la VO1);load audio source
(aap 1 (BLACK . 36));aap is apend audio playlist
(aap 1 ((VO1 . "16:29:42;13" ) . 853))
(aap 1 (BLACK . 11))
(la TechnoAl)
(aap 0 ((TechnoAl . "16:01:05;23" ) . 892))
(aap 0 (BLACK . 8))
(ls Kj)
(ls KeyFinal)
(ls Kaa)
(ls Ku)
;;ap is append playlist, parameters are a video segment, pulled
;;by reference index, and a length value, measured in frames
(ap    ((Kj . "16:52:54;20" ) . 40))
(ap    ((KeyFinal . "00:00:14;21" )   . 16))
(ap    ((KeyFinal . "00:00:15;25" )   . 3))
(ap    ((KeyFinal . "00:00:15;10" )   . 3))
(ap    ((KeyFinal . "00:00:15;25" )   . 3))
(ap    ((KeyFinal . "00:00:15;16" )   . 3))
(ap    ((KeyFinal . "00:00:15;25" )   . 3))
(ap    ((KeyFinal . "00:00:15;22" )   . 28))
(ap    ((KeyFinal . "00:00:17;13" )   . 5))
(ap    ((KeyFinal . "00:00:16;25" )   . 147))
(ap    ((KeyFinal . "00:00:17;13" )   . 5))
(ap    ((Kaa . "18:12:38;19" )   . 6))
(ap    ((Kaa . "18:12:39;09" )   . 6))
(ap    ((Kaa . "18:12:39;29" )   . 6))
(ap    ((Kaa . "18:12:40;19" )   . 6))
(ap    ((Kaa . "18:12:41;09" )   . 7))
(ap    ((KeyFinal . "00:00:22;28" )   . 61))
(ap    ((Ku . "17:41:24;29" )   . 4))
(ap    ((Ku . "17:41:25;13" )   . 4))
(ap    ((Ku . "17:41:25;27" )   . 4))
(ap    ((Ku ."17:41:26;11" )   . 4))
(ap    ((Ku ."17:41:26;25" )   . 4))
(ap    ((Ku . "17:41:27;09" )   . 4))
(ap    ((Ku . "17:41:27;23" )   . 4))
(ap    ((Ku . "17:41:28;07" )   . 4))
(ap    ((KeyFinal . "00:00:26;01" )   . 37))
(ap    ((KeyFinal . "00:00:26;17" )   . 11))
(ap    ((KeyFinal . "00:00:27;22" )   . 108))
(ap    ((KeyFinal . "00:00:32;16" )   . 8))
(ap    ((KeyFinal . "00:00:32;16" )   . 20))
(ap    ((KeyFinal . "00:00:32;16" )   . 8))
```

APPENDIX-continued

```
(ap    ((KeyFinal . "00:00:32;16" )   . 325))
(ap    (BLACK . 3))
(at 0 (text "Visible World" 0.1 0.20 35 Courier" 0.0 0.5 0.5)
60); at is apply text, for text graphics
(at 0 (text "527W, 34th street" 0.1 0.35 40 "Courier" 0.0 0.5
0.5) 60)
(at 0 (text "New York, NY 10001" 0.1 0.50 40 "Courier" 0.0 0.5
0.5) 60)
(at 0 (text "www.visibleworld.com" 0.1 0.65 40 "Courier" 0.0 0.5
0.5) 60)
(at 60 (text "Prepared for:" 0.1 0.20 40 "Courier" 0.0 0.5 0.5)
60)
(at 60 (text "Sonam" 0.1 0.35 40 "Courier" 0.0 0.5 0.5) 60)
(at 60 (text "English" 0.1 0.5 40 "Courier" 0.0 0.5 0.5) 60)
(at 60 text "Date:01/19/00" 0.1 0.65 40 "Courier" 0.0 0.5 0.5)
60)
(at 60 (text "Time:15:52:10" 0.1 0.80 40 "Courier" 0.0 0.5 0.5)
60)
```

What is claimed is:

1. A system for dynamically constructing a non-interactive personalized advertisement to be viewed by an intended audience over a network, comprising:
   an advertisement template, defining a framework for constructing said personalized advertisement, said advertisement template comprising a plurality of media segment slots constituting said personalized advertisement, said media segment slots including video segment slots and audio segment slots, wherein at least one video segment slot overlaps at least one audio segment slot;
   a plurality of media segments including video segments and audio segments each video segment selectable for insertion into at least one of said video segment slots of said advertisement template, wherein several of said video segments are selectable for a same one of said video segment slots of said advertisement template, and wherein each audio segment is selectable for insertion into at least one of said audio segment slots of said advertisement template;
   a plurality of expert rules; and
   an advertisement assembly component, responsive to user profile data of said intended audience, and configured to apply said plurality of expert rules to said user profile data in order to get appropriate media segments for each of said media segment slots of said advertisement template from a database and incorporate said appropriate media segments into said advertisement template, in order to assemble said personalized advertisement for said intended audience, said assembly performed in real-time with transmission of the personalized advertisement over the network without interaction by said intended audience.

2. The system of claim 1 wherein said advertisement assembly component also uses environmental or temporal information in order to select appropriate media segments for assembling said personalized advertisement.

3. The system of claim 1 wherein said media segments are selected from the group including audio, video, background, animation, synthesized graphics and voice.

4. The system of claim 1 wherein several of said media segments which correspond to a same one of said media segment slots of said advertisement template are of different lengths, and said advertisement template appropriately adjusts said personalized advertisement based on a length of a selected one of said media segments.

5. The system of claim 1 wherein said user profile data of said intended audience is obtained from a plurality of user information data sources.

6. The system of claim 5 wherein said advertisement campaign includes a target entity profile, said target entity profile providing an indication of appropriate media segments for selected user profile data.

7. The system of claim 6 wherein said target entity profile provides an indication for selecting said intended audience from said user information data sources.

8. A computer implemented method for dynamically constructing a non-interactive personalized advertisement for viewing by an intended audience over a network; said method comprising:

obtaining by a processor user profile data from a profile database for said intended audience;

selecting from an interface an advertisement template from a template database, said advertisement template defining a framework for constructing said personalized advertisement, and including a plurality of media segment slots constructing said personalized advertisement, said media segment slots including video segment slots, wherein a least one video segment slot overlaps a least one audio segment slot;

applying by the processor a plurality of expert rules to said user profile data and said advertisement template, in order to get, from a plurality of media segments including video segments and audio segments in a database, appropriate media segments for insertion into said plurality of media segment slots in said advertisement template, wherein several of said video segments are selectable for a same one of said video segment slots of said advertisement template;

assembling in real-time with delivery to said intended audience by the processor said personalized advertisement using said advertisement template and said selected media segments, without any interaction by said intended audience; and providing by the processor said assembled personalized advertisement in a format for delivery over said network to said intended audience for viewing.

9. The method of claim 8 wherein said advertisement template and plurality of message segments are created as part of an advertisement campaign.

10. A computer implemented method for dynamically constructing a non-interactive personalized advertisement for viewing by an intended audience; said method comprising:

obtaining by a processor user profile data from a profile database for said intended audience;

creating by the processor a plurality of media segments, including video segments and audio segments;

selecting from an interface an advertisement template, said advertisement template defining a framework for constructing said personalized advertisement, and including a plurality of media segment slots constituting said personalized advertisement, said media segment slots including video segment slots and audio segment slots, wherein at least one video segment slot overlaps at least one audio segment slot;

applying by the processor a plurality if expert rules to said user profile data and said advertisement template in order to select from a plurality of media segments including video segments and audio segments in a database appropriate media segments for insertion into said plurality of media segment slots in said advertisement template, wherein several video segments are selectable for a same one of said video segment slots of said advertisement template;

assembling in real-time with delivery to said intended audience by the processor said personalized advertisement using said advertisement template and said selected media segments, without any interaction by said intended audience; and providing said assembled personalized advertisement in a format for delivery to said intended audience over said network for viewing.

* * * * *